July 7, 1942.　　　H. F. MERRIAM ET AL　　　2,288,729
PROCESS FOR MAKING SULPHUR OIL
Filed Feb. 21, 1940
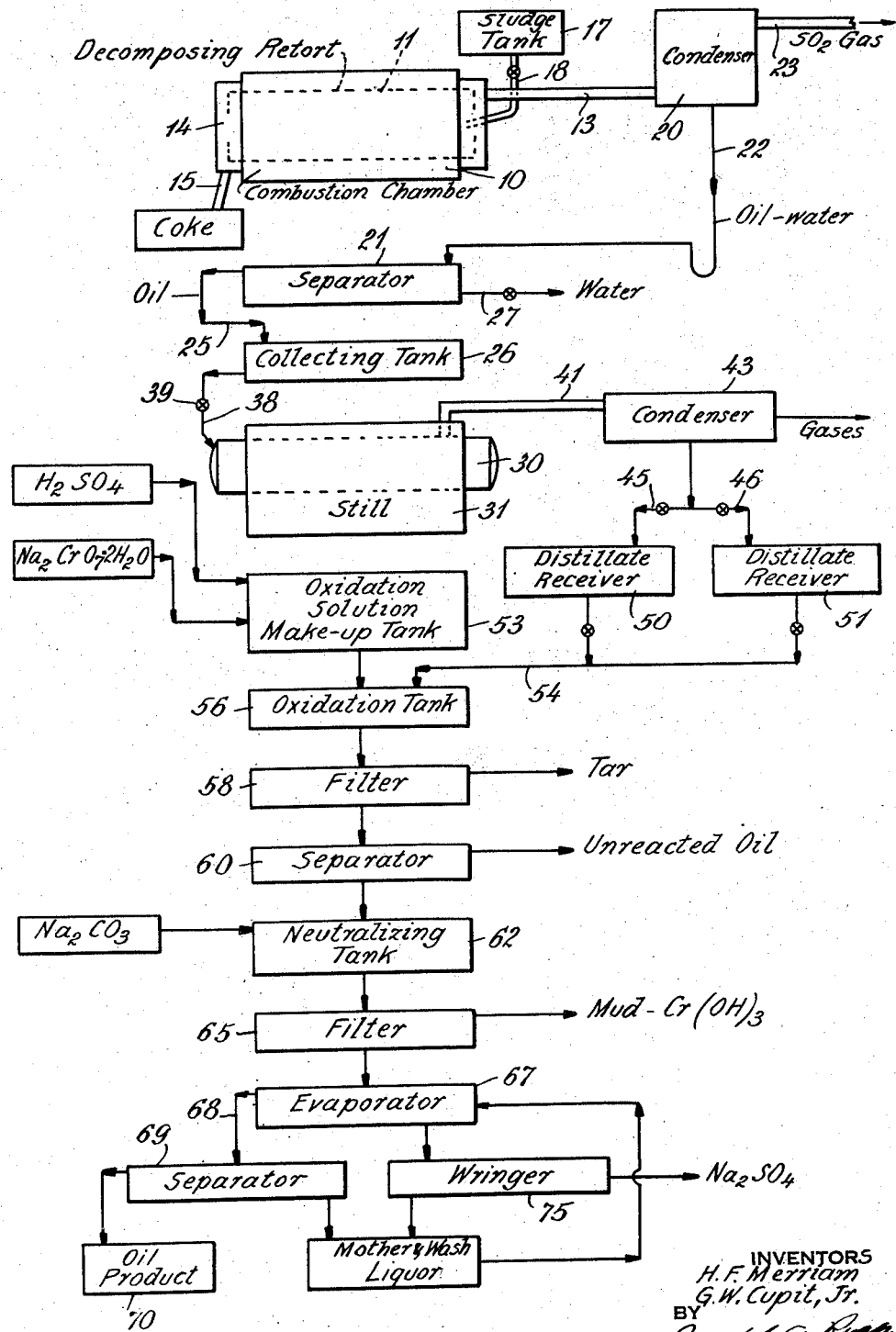
INVENTORS
H. F. Merriam
G. W. Cupit, Jr.
BY
ATTORNEY Patented July 7, 1942

2,288,729

UNITED STATES PATENT OFFICE 2,288,729

PROCESS FOR MAKING SULPHUR OIL

Henry F. Merriam, West Orange, N. J., and George W. Cupit, Jr., Enid, Okla., assignors to General Chemical Company, New York, N. Y., a corporation of New York Application February 21, 1940, Serial No. 320,034

11 Claims. (Cl. 196—148)

This invention relates to methods for manufacture of sulphur bearing oils soluble in water and in dilute mineral acid solutions. More especially, the invention is directed to methods for production of water soluble sulphur bearing oils from sludges formed in oil refining processes in which sulphuric acid is employed.

The principal objects of the invention are directed to provision of improved methods for making water soluble sulphur bearing oils of high sulphur content. It is the object of one phase of the invention to provide methods for producing water soluble sulphur bearing oils from sulphur bearing oils which are readily soluble in strong sulphuric acid but only sparingly soluble in dilute acid and relatively insoluble in water. The invention also aims to provide methods for making practically odorless, water soluble oils having especially high sulphur content all of which sulphur is in strong chemical combination. Further objects of the invention are to provide methods for making soluble high sulphur oils which are stable and do not become turbid, or deposit sulphur on standing.

In oil refining processes, involving treatment with sulphuric acid of petroleum distillate oils obtained from sulphur containing crudes, large quantities of sludges are produced. On dissociation by heating, these sludges form gas mixtures containing water vapor and condensable hydrocarbon vapors, and gases such as sulphur dioxide, carbon dioxide, nitrogen and uncondensable hydrocarbons. On cooling such gas mixtures, for example to about normal temperature, there are obtained crude sulphur oil condensates herein referred to as initial sulphur oils, which are sulphur bearing oils containing sulphur constituents of variable types and quantities depending largely upon the nature of the original sludge material. These sulphur constituents are so complex that accurate analysis by known methods has not been possible. The crude sulphur oils are insoluble in water and in dilute acid solutions. Further, in instances such oils are too objectionably odorous for use in some of the arts.

As a result of investigations directed to increasing general utility of high sulphur oils derived from petroleum refining sludges, we have found that a substantial portion of certain water insoluble sulphur constituents contained in or derived from crude or initial sulphur bearing oils of the type described may be converted to water soluble form by subjecting such constituents to a herein described oxidation operation. We further find that such operation, in addition to forming a high sulphur oil having the desired water soluble properties, results in production of an oil which for practical purposes is odorless.

One preferred embodiment of the invention may be very briefly outlined in a general way as follows. Crude or initial sulphur oil is treated with an aqueous solution comprising sodium dichromate and sulphuric acid in a manner subsequently detailed to bring about conversion or apparent oxidation to water soluble form of certain of the water insoluble sulphur constituents of the initial oil. After completion of the oxidation reaction, the mass is filtered to separate any solids and the filtrate allowed to settle. The resulting upper layer of unreacted insoluble sulphur oil and the lower aqueous layer containing the sought-for water soluble sulphur constituents are separated. The aqueous liquor is rendered slightly alkaline to precipitate chromium as chromium hydroxide. After the latter is filtered off, the filtrate is evaporated so as to form a supernatant layer of water soluble high sulphur oil and an under layer of mother liquor. The oil layer is drawn off, settled to effect thorough separation of oil and of mother liquor, and the final product of the process is recovered as by decantation. The water soluble high sulphur oils so formed are stable, practically odorless, and do not deposit free sulphur on long standing or by chilling.

A further appreciation of the objects and advantages of the invention may be had from consideration of the following description taken in connection with the accompanying drawing illustrating diagrammatically apparatus which may be used.

Referring to the drawing, 10 indicates the combustion chamber of a furnace adapted to burn any suitable fuel. In chamber 10 is a kiln 11, for example a fixed shell provided with suitable mechanism to facilitate discharge of coke. A rotary retort may be employed if desired. Preferably, an externally heated kiln adapted to substantially exclude admission of air is used. One end of kiln 11 communicates with a gas outlet 13, and the opposite end projects into a header 14 into which solid residue of the sludge is continuously discharged. Header 14 empties into airlock 15 through which coke may be discharged without admitting air to the kiln. Sludges are run into the kiln from tank 17 through pipe 18. Outlet 13 is connected to condenser 20 the condensate of which drains into a separating tank 21 through pipe 22. Gases uncondensed in cooler 20, containing principally sulphur dioxide, are discharged through gas line 23, and may be used for example in the manufacture of sulphuric acid by the contact process. Separator 21 may be large enough to permit continuous gravity separation of water and oil contained in the condenser condensate. Sulphur bearing hydrocarbon oils are withdrawn through pipe 25 discharging into collecting tank 26.

Still 30 may be externally heated by hot combustion gases generated in brickwork setting 31. Crude condensate from tank 26 is run into the still through pipe 38, controlled by valve 39. Vapors generated in the still flow through line 41 to a condenser 43, the condensate of which drains through pipes 45 or 46 into receivers 50 or 51.

Acid sludges which may be used to advantage are those resulting from sulphuric acid treatment of distillate oils obtained from petroleum crudes containing sulphur. Sludges employed are preferably those resulting from sulphuric acid treatment of light hydrocarbon oil distillates such as gasoline and kerosene, containing not less than about 0.15% sulphur, although distillates containing less sulphur may be employed if desired. Examples of distillate oils from which sludges are produced of a character suitable for use in the present invention are straight-run gasoline distillates containing about 0.15% sulphur or more, and cracked distillate averaging 0.25 to 0.30% sulphur or more.

Sludge material, which may have for example a titratable acidity of 40% to 60% expressed as $H_2SO_4$, is continuously fed into kiln 11. Burners in furnace 10 are adjusted to maintain within the kiln temperatures desirably not in excess of about 750° F., as above this temperature the sulphur oils constituting basis of the products of the invention tend to be decomposed. The preferred temperatures are about 250° F. at the sludge inlet end, and about 500° F. to 600° F. at the coke outlet end of the kiln. The sludge is relatively gradually heated through the preferred temperature range, and free and/or combined sulphuric acid of the sludge is reduced to sulphur dioxide by the hydrogen of the hydrocarbons and/or by the carbonaceous matter contained in the sludge. The sludge is thus dissociated with production of water vapor, and hydrocarbon vapors and sulphur compounds are formed. Residual coke is continuously discharged from the kiln through airlock 15. The major part of the sulphur oils appears to have been evolved by the time the sludge has reached a temperature of 350–400° F.

The gas resulting from sludge dissociation contains principally water vapor and sulphur dioxide, substantial amounts of condensable hydrocarbons and sulphur compounds, and smaller quantities of uncondensable hydrocarbons and gases such as carbon dioxide, carbon monoxide, and nitrogen. Sludges of the kinds mentioned produce from say 5 to 15% condensable oils based on the weight of the original sludge. According to the preferred method, decomposition of sludges is effected in the kiln substantially in the absence of oxygen and in the absence of other extraneous gases. When so operating, the volume of gas formed is lessened and loss of sulphur oil by volatilization is decreased. Hot gaseous and vaporous products of sludge dissociation pass into condenser 20 in which the gases are cooled to substantially room temperature. Cooling may be accomplished by circulating any suitable cooling liquid or gas through the condenser in indirect heat exchange relation with the retort gas mixture. On cooling, substantially all of the water vapor and the major portion of the condensable hydrocarbon vapors and sulphur compounds are condensed. Condensate, containing varying proportions of water, liquid hydrocarbons and sulphur compounds, is drained into separator 21. In the latter, the oils rise to the top of the liquid mass in the tank, and may be intermittently or continuously withdrawn through pipe 25 into tank 26 for collecting raw condensate or initial sulphur oil. Water settling to the bottom of the separator 21 is discharged from the system through pipe 27.

Oil in tank 26 is a sulphur bearing oil containing generally from about 2 to sometimes upwards of 25% sulphur, in strong chemical combination. Sulphur content may vary considerably in accordance with the characteristics of the original petroleum crudes and of the acid sludges produced on treatment of the hydrocarbon oil distillates with sulphur acid. For example, a sludge formed by sulphuric acid treatment of a straight-run gasoline yielded an oil condensate of 12% by weight of the sludge, the condensate analyzing 14.8% sulphur. A cracked distillate sludge yielded 10% by weight of oil condensate having a sulphur content of 7.5%. In another instance, a cracked distillate averaging about .25 to .30% sulphur produced on treatment with sulphuric acid a sludge which, on treatment in accordance with the present method, yielded 10.8% by weight of oil condensate analyzing 20.8% sulphur. While the sulphur content of the initial sulphur oils may vary widely as indicated, experience shows these oils average about 20% sulphur by weight.

Initial sulphur oils thus obtained, while readily soluble in strong sulphuric acid, are relatively water insoluble. We have discovered that a substantial portion of certain water insoluble sulphur constituents contained in or derived from an initial high sulphur oil of the type described may be converted to water soluble sulphur oils by subjecting such constituents to the action of an oxidizing agent. The water soluble oils thus produced may be recovered readily from the oxidation reaction mass. In this way, we are enabled to produce stable, water soluble oils which are substantially odorless and are of high sulphur content generally comparable with the sulphur content of the initial sulphur oil.

The hereafter detailed oxidation treatment to produce water soluble oil may be applied if desired directly to an initial sulphur oil as recovered in tank 26. However, such oil contains appreciable quantities of foreign matter, such as coke-dust and tars, which under most circumstances preferably should be removed. Separation of foreign matter from initial oil may be effected by distillation producing a tarry still residue and a distillate sulphur oil. If desired, the oxidation treatment may be applied to the sulphur bearing oil of tank 26 after removal of the foreign matter such as coke-dust and tars. However, since different fractions, e. g. a light or a heavy fraction, are suited for different uses in the arts, according to the more satisfactory procedure for making the oils of the invention, it is preferred to (1) remove from the initial sulphur oil of tank 26 by distillation the foreign matter; (2) simultaneously fractionate the initial oil during distillation to recover preferably a light fraction and a heavy fraction; and (3) then subject either or both fractions to oxidation treatment.

To remove foreign matter from the raw condensate of tank 26 and to split the condensate into two or more fractions, oils from tank 26 are run into still 30 through line 38. It is preferred to fractionate to obtain a relatively light fraction containing oils distilling over at temperatures up to about 340° F., and a heavier fraction including oils boiling above 340° F., and preferably not above about 475°. However, in some instances, the light fraction may contain oils boiling up to about 350° F., and the heavy fraction may comprise oils boiling from about 340° F. to desirably not more than 650° F. The distillation operation may be carried out in any suitable still, preferably one provided with equipment for collecting separate fractions of distillate. Steam, vacuum or straight fire distillation may be used. The oil of the invention most adaptable for general use is one obtained from a hereafter noted high boiling fraction. With respect to this fraction, we have found that best yields are obtained by straight fire distillation of the oil of tank 26. By this mode of distillation, we are enabled to obtain yields of say 35–40% by weight (based on oil fed into the still) of high boiling fraction.

Externally heated still 30 may be operated at one atmosphere pressure to produce a first cut including all oils distilling over at temperatures up to about 340° F. Vapors are liquefied in cooler 43, and condensate run into receiver 50. In the case of one initial sulphur oil, having a sulphur content of about 20% by weight, this low boiling fraction constituted about 46% by weight of the initial sulphur oil fed into still 30. When removal of the low boiling fraction from the oil in the still is substantially complete, the temperature is raised to distill over as a second cut oils having boiling points ranging from about 340° F. up to preferably about 475° F. Vapors formed are condensed and recovered in receiver 51. In this example the high boiling fraction comprised about 39% by weight of the initial crude sulphur oil introduced into still 30. Approximately 13% by weight of the initial sulphur oil remained in still 30 as a coke or asphalt residue, and the balance was lost as uncondensable vapors and gases. The cuts obtained had the following properties:

|  | Cut 1 | Cut 2 |
| --- | --- | --- |
| S. G. at 60° F | .91 | .92. |
| Per cent sulphur by weight | 22.5 | 16.5. |
| Color | Pale yellow | Light amber. |
| Pour freely | Below zero °F | Below zero °F. |

The low boiling cut recovered in receiver 50 usually contains a slightly higher percentage of sulphur than the higher boiling fraction collected in receiver 51. If desired, all of the vapors evolved in still 30 may be condensed and collected in a single receiver instead of in two receivers as 50 and 51. In this situation, the condensate collected corresponds in a general way with the condensate collected in tank 26 except that foreign matter, such as coke-dust and tars, has been removed. Little is known of the exact composition of these oils. Generally described they are water insoluble, transparent and light-bodied, viscosity being around 32 to 34 Saybolt at 100° F. Color ranges from faint yellow thru light red. Sulphur content may vary from about 2 to in some cases upwards of 25% by weight. All of the sulphur is in strong chemical combination. It appears substantial amounts of the contained sulphur is present as alkyl sulphides and possibly some disulphides, and other sulphur bearing compounds. Specific gravity is usually less than one. On chilling or long standing, the oils do not become turbid or deposit sulphur. In accordance with the invention, water insoluble oils preferably such as above noted are subjected to the action of an oxidation agent to form the water soluble product of the present process.

We find it is possible to effect conversion of water insoluble sulphur constituents to water soluble form, by means of oxidizing agents such as: hexavalent chromium compounds such as alkali metal dichromates and chromates, and chromic acid; alkali metal permanganates; and nitric acid. The hexavalent chromium compounds are the preferred oxidizing agents. Best commercially satisfactory results are secured by employing enough mineral acid, e. g. sulphuric acid, to keep all the chromium in solution as chromium sulphate. We find first, the higher the acidity of the reaction mass the more efficient use is made of the oxidizing agent; and second, by keeping all chromium in solution it is possible to avoid formation of gelatinous chromium hydroxide precipitate which materially interferes with a subsequent separation of insoluble oil and an aqueous liquid containing the water soluble oil. Following is a specific illustration of a preferred embodiment using sodium dichromate as the oxiding agent.

Example 1

In lead-lined tank 53 a water insoluble sulphur oil treating solution is made up by adding (all parts by weight) 31.5 parts of $Na_2Cr_2O_7.2H_2O$ to 756 parts of water, and then introducing 50 parts of 66° Bé. $H_2SO_4$ (93.2% $H_2SO_4$). About 59 parts of a high boiling fraction (340–475° F.) from receiver 51 and having a sulphur content by weight of 16.5% are run thru pipe 54 into lead-lined oxidation tank 56 preferably equipped with a high-speed lead-covered stirrer and an associated stationary lead boot with bottom perforations, thus insuring violent agitation and minimizing tarry matter contamination of the agitator blades. After starting vigorous agitation, oxidizing solution is fed in from tank 53 over a period of about 3 hours. At the end of about 7 hours, agitation is stopped, i. e. after a test portion of the mass in the oxidation tank indicated that reduction of dichromate is complete. Temperature during reaction was about 91° F. On completion of oxidation, the mass in tank 56 comprises principally unreacted upon and hence water insoluble sulphur oil, water soluble sulphur oil formed by the oxidizing agent treatment, water, sodium sulphate and chromium sulphate both in solution, and variable amounts of brown tarry material carried in suspension. In the present example solids amounted to about 3% by weight of the reaction mass. The mass from tank 56 is run thru a sand filter 58 to remove tarry and other solids, and the filtrate is collected in a lead-lined separator 60. In the latter, the liquor is settled to thereby form an upper layer of unreacted water insoluble sulphur oil and a lower aqueous oxidation reaction product layer comprising chiefly water soluble high sulphur oil, water, and sodium and chromium sulphates in solution. After thorough settling the supernatant unreacted water insoluble oil is decanted off and the lower aqueous liquor layer is transferred to neutralizing tank 62.

To the aqueous liquor in tank 62, dry soda ash is added with stirring in quantity to create slight alkalinity, e. g. pH of about 7.1. During neutralization the liquor is heated to about 170° F. to insure removal of $CO_2$ and effect formation of a $Cr(OH)_3$ precipitate in readily filterable form. The neutralized oxidation solution is then pumped into a filter press 65 to remove chromium hydroxide from solution. The filtrate is charged into an evaporator 67, the filter cake washed with hot water and the washings combined with the filtrate. Alternatively, washings may be fed back into make-up tank 53 for use in a subsequent run. The filter press mud, comprising principally chromium hydroxide, may be treated in any suitable way for recovery of chromium values.

Evaporator 67 is equipped with heating coils to which steam at approximate maximum of 250° F. is supplied. The aqueous mass is evaporated at atmospheric pressure preferably just to the point at which sodium sulphate tends to crystallize out. This procedure makes possible a relatively clean separation of oil and mother liquor and avoids formation of a mushy mass of crystals and adhering sulphur oil. During evaporation water is removed as steam, and water soluble sulphur oil collects at the surface, while the mother liquor consisting principally of a very nearly saturated solution of sodium sulphate containing possibly some sodium sulphate crystals and $Cr(OH)_3$ sinks to the bottom. From time to time water soluble sulphur oil product is decanted off from the top of the mass in the evaporator and run through pipe 68 into a second separator 69. In the latter the oil is allowed to settle to drop out any small amounts of mother liquor and sodium sulphate which may crystallize. The final water soluble sulphur oil of the invention is drawn off the top of separator 69 and fed into product tank 70. In some instances, during the evaporation operation a small amount of flocculent $Cr(OH)_3$ may separate out. Any of such precipitate carried out of the evaporator in the supernatant water soluble oil may be removed by means of a filter in line 68. Experience indicates, however, in the majority of cases such filtration is unnecessary. Evaporator mother liquor is run through wringer 75 to separate sodium sulphate crystals, and mother liquor from separator 69 and wringer 75, and wash water from wringer 75 are recycled through evaporator 67.

In the particular example yield of water soluble sulphur oil was about 35% by weight based on the weight of the high boiling fraction charged into oxidation tank 56. In other operations, using high boiling fractions, yields up to 65% have been obtained. Specific gravity of the product of the example under discussion was about 1.05, and the sulphur content by weight was 12%.

Low boiling fraction from receiver 50 may be subjected to oxidation treatment in a way similar to that described in Example 1. In the case of low boiling fractions, yields of water soluble product are generally higher, amounting to as much as 75%. The oxidation treatments of the invention may also be applied to refined extracted water insoluble sulphur oils such as the products of Merriam and Cupit U. S. Patent 2,115,426 of April 26, 1938.

*Example 2*

Following is an illustration of practice of the invention using potassium permanganate as oxidizing agent. A treating solution is made up by thoroughly mixing (all parts by weight) about 75 43 parts of $KMnO_4$ and 45 parts of 66° Bé. $H_2SO_4$ (93.2% $H_2SO_4$) with 1890 parts of water. The initial water insoluble sulphur oil used had a sulphur content of 22.5% by weight and was a condensate obtained by steam distilling a light hydrolyzed sulphur oil fraction (boiling below about 340-350° F.) made by the process disclosed in the Merriam and Cupit patent. While vigorously agitating, the oxidizing solution is added in small portions to about 23 parts of the water insoluble sulphur oil until the resulting mass becomes permanently pink in color. In this run, temperature was kept at about 45° F. by cooling. On completion of reaction, a small amount of $MnO_2$ remaining in the mixture is dissolved by gassing with sufficient $SO_2$ to produce a colorless solution. The mass is permitted to settle, and the aqueous oxidation solution (lower layer) containing water soluble product oil and unreacted water insoluble oil (upper layer) are separated by steam distilling off the insoluble oil. The aqueous oxidation solution is evaporated and then treated with sufficient ether to extract the water soluble oil from the aqueous residue. Ether is distilled out of the extract mass to recover the final product. In this instance, about 75% by weight of the sulphur oil treated was recovered as a water soluble sulphur oil having a sulphur content of 17.5% by weight.

*Example 3*

About 50 parts (all parts by weight) of water insoluble sulphur oil similar to that used in Example 2 is treated at room temperature with 200 parts of 30% $HNO_3$, the latter being added over a period of about 2 hours while vigorously agitating. The mass is settled and the aqueous oxidation solution (lower layer) containing water soluble product oil and unreacted water insoluble oil (upper layer) separated by decantation. The aqueous oxidation solution is neutralized with caustic soda, and then made slightly acid by addition of nitric acid. The resulting mass is treated with sufficient ether to extract the water soluble oil from the aqueous residue. The ether extract is dried by use of anhydrous $Na_2SO_4$, hydrated $Na_2SO_4$ separated, and the ether distilled off to recover final product. In this run, about 22% by weight of the intial sulphur oil treated was recovered as water soluble sulphur oil having a sulphur content by weight of 15.6%.

Compositions of the product oils obtained by the several modifications of this invention are complex and not definitely known. As far as we are aware, the products probably contain oxidation products such as sulfones in varying quantities depending upon the nature of the original sludge material and the particular mode of processing. Sulphur content ranges from about 11% to about 19% by weight. Specific gravity varies generally from one plus to about 1.07. The products are practically odorless, and are soluble in water and dilute sulphuric, hydrochloric and nitric acids. The oils are transparent, and color ranges from pale yellow into light red. Viscosity is low, of the order of 32 to 34 Saybolt at 100° F. Chilling to zero (°F) does not affect stability or create turbidity, and sulphur does not settle out on long standing.

Reactions taking place during the water insoluble sulphur oil treatment operations of the invention are complicated and are not understood. Our belief is that some of the water insoluble sulphur constituents of the sulphur oils are oxidized to a water soluble form. Our investigations show that temperatures at which the reaction is carried out, amounts of oxidizing agents used, and the acid concentration of the mass during the oxidation operation are features of importance. These factors in one way or another in some manner not understood affect yields of the desired final products. It is our belief that excessive temperatures, or amounts of oxidizing agents, or acid concentrations singly or in any combination cause what may be "over-oxidation" of some constituents of the oil being treated bringing about increased formation of tarry-like solid material which apparently results in material decrease of yield.

As to all modifications of the invention, we find that temperature during treatment operation should not exceed about 150° F. When using chromium compounds as oxidizing agents experience shows that most advantageous working temperatures are from about 70 to about 115° F. Generally, the higher the concentration of oxidizing agent and/or acid, the lower should be temperatures. When using oxidizing agents such as permanganates and nitric acid, temperatures should be kept preferably at room temperature or less.

With regard to the amount of oxidizing agent used, we find that in the case of chromium compounds and permanganates, oxidizing agent introduced should not exceed about 10% by weight of the reaction mass, e. g., the mass in an oxidation tank such as tank 56 of the drawing. When employing nitric acid, the HNO₃ concentration of reaction mass should not be greater than about 30% by weight. In one instance, where the HNO₃ concentration of the mass was about 35%, the reaction was vigorously exothermic and resulted in formation of much tarry material.

We have observed the presence of at least some sulphuric acid facilitates the oxidation reaction. Further, it is preferred to use sulphuric acid in amount at least sufficient to keep all chromium compound in solution, since in this way we have found it possible to secure best yields and most satisfactory overall operating conditions. The same principles apply when using permanganates as the oxidizing agent; namely, desirably some sulphuric acid should be present in reaction mass and preferably enough to keep as much of the manganese as possible in solution. There may be instances, in the case of the permanganates, when in spite of the presence of a theoretical sufficiency of sulphuric acid that some MnO₂ precipitate appears in the mass after oxidation is complete. In such instances, it is desirable to gas the mass with SO₂ until all MnO₂ goes into solution. When using either chromium compounds or permanganates the sulphuric acid concentration of the reaction mass should not exceed about 15% by weight.

On account of the widely varying characteristics of the water insoluble sulphur oils which may be treated in accordance with the invention, it is not possible to state more fully than above as to the quantities of reagents to be employed. Having regard for the above discussed amounts of oxidizing agents and/or acids to be used, a few test runs on any particular water insoluble sulphur oil will indicate to the operator the most satisfactory quantities of reagents for a given water insoluble sulphur oil.

Instead of decomposing the acid sludge by heating as described in connection with the drawing, the original acid sludge may be subjected to hydrolysis as by steaming with live steam, for say an hour, until separation of weak acid (sludge acid) and an upper acid tar layer takes place. The weak acid may be drawn off and the resulting acid tar or sludge material dissociated by heating as in a retort 11. The oily distillate may be taken in two or more cuts if desired, although it is preferred to collect the oily distillate as in a tank 26. During steaming of the acid sludge a light-colored distillate may be recovered in a suitable condenser. This distillate and the condensate collected in tank 26 may be separately treated as already described to produce high sulphur refined oils, or may be combined and then so treated.

We claim:

1. The method for making water soluble sulphur bearing oil comprising dissociating sludge material, resulting from sulphuric acid treatment of hydrocarbon oil distillate obtained from sulphur containing crudes, with aid of heat at temperature of not more than about 750° F. to break up the sludge under conditions to form a hot gas mixture containing water and hydrocarbon oil vapors, cooling the mixture to form a condensate containing water and oil comprising water insoluble sulfur constituents, treating water insoluble constituents of such condensate with hexavalent chromium compound, in the presence of sulphuric acid, to convert at least a portion of said sulphur constituents to water soluble form, and recovering water soluble sulphur bearing oil from the resulting reaction mass.

2. The method for making water soluble sulphur bearing oil comprising dissociating sludge material, resulting from sulphuric acid treatment of hydrocarbon oil distillate obtained from sulphur containing crudes, with aid of heat at temperature of not more than about 750° F. to break up the sludge under conditions to form a hot gas mixture containing water and hydrocarbon oil vapors, cooling the mixture to form a condensate comprising water and oil, separating water and oil, distilling the oil to form a condensate comprising water insoluble sulphur constituents, treating water insoluble constituents of such condensate with hexavalent chromium compound, in the presence of sufficient sulphuric acid to keep chromium in solution, to convert at least a portion of said sulphur constituents to water soluble form, and recovering water soluble sulphur bearing oil from the resulting reaction mass.

3. The method for making water soluble sulphur bearing oil comprising dissociating sludge material, resulting from sulphuric acid treatment of hydrocarbon oil distillate obtained from sulphur containing crudes, with aid of heat at temperature of not more than about 750° F. to break up the sludge under conditions to form a hot gas mixture containing water and hydrocarbon oil vapors, cooling the mixture to form a condensate comprising water and oil, separating water and oil, distilling the oil to form a condensate comprising water insoluble sulphur constituents, treating water insoluble constituents of such condensate with hexavalent chromium compound, in the presence of sufficient sulphuric acid to keep chromium in solution, to convert at least a portion of said sulphur constituents to water soluble form, maintaining temperature of the reacting mass during treatment not in excess of about 150° F., and recovering water soluble sulphur bearing oil from the reaction mass.

4. The method for making water soluble sulphur bearing oil comprising dissociating sludge material, resulting from sulphuric acid treatment of hydrocarbon oil distillate obtained from sulphur containing crudes, with aid of heat at temperature of not more than about 750° F. to break up the sludge under conditions to form a hot gas mixture containing water and hydrocarbon oil vapors, cooling the mixture to form a condensate comprising water and oil, separating water and oil, distilling the oil to form a condensate comprising water insoluble sulphur constituents, treating water insoluble constituents of such condensate with hexavalent chromium compound, in the presence of sufficient sulphuric acid to keep chromium in solution, to convert at least a portion of said sulphur constituents to water soluble form, the amount of said chromium compound used being not in excess of about 10% by weight of the reaction mass, and recovering water soluble sulphur bearing oil from the reaction mass.

5. The method for making water soluble sulphur bearing oil comprising dissociating sludge material, resulting from sulphuric acid treatment of hydrocarbon oil distillate obtained from sulphur containing crudes, with aid of heat at temperature of not more than about 750° F. to break up the sludge under conditions to form a hot gas mixture containing water and hydrocarbon oil vapors, cooling the mixture to form a condensate comprising water and oil, separating water and oil, distilling the oil to form a condensate comprising water insoluble sulphur constituents, treating water insoluble constituents of such condensate with hexavalent chromium compound, in the presence of sufficient sulphuric acid to keep chromium in solution, to convert at least a portion of said sulphur constituents to water soluble form, the amount of sulphuric acid present being not in excess of about 15% $H_2SO_4$ by weight of the reaction mass, and recovering water soluble sulphur bearing oil from the reaction mass.

6. The method for making water soluble sulphur bearing oil comprising dissociating sludge material, resulting from sulphuric acid treatment of hydrocarbon oil distillate obtained from sulphur containing crudes, with aid of heat at temperature of not more than about 750° F. to break up the sludge under conditions to form a hot gas mixture containing water and hydrocarbon oil vapors, cooling the mixture to form a condensate comprising water and oil, separating water and oil, distilling the oil to form a condensate comprising water insoluble sulphur constituents, treating water insoluble constituents of such condensate with hexavalent chromium compound, in the presence of not in excess of about 15% $H_2SO_4$ by weight of the reaction mass, to convert at least a portion of said sulphur constituents to water soluble form, separating unreacted oil from the resulting aqueous reaction mixture, separating chromium compound therefrom, and recovering water soluble sulphur bearing oil from the residue.

7. The method for making water soluble sulphur bearing oil comprising dissociating sludge material, resulting from sulphuric acid treatment of hydrocarbon oil distillate obtained from sulphur containing crudes, with aid of heat at temperature of not more than about 750° F. to break up the sludge under conditions to form a hot gas mixture containing water and hydrocarbon oil vapors, cooling the mixture to form a condensate comprising water and oil, separating water and oil, distilling the oil and recovering as condensate a fraction boiling at temperature not more than about 340–350° F. and comprising water insoluble sulphur constituents, treating water insoluble constituents of such fraction with hexavalent chromium compound in the presence of sufficient sulphuric acid to keep chromium in solution to convert at least a portion of said sulphur constituents to water soluble form, and recovering water soluble sulphur bearing oil from the resulting reaction mass.

8. The method for making water soluble sulphur bearing oil comprising dissociating sludge material, resulting from sulphuric acid treatment of hydrocarbon oil distillate obtained from sulphur containing crudes, with aid of heat at temperature of not more than about 750° F. to break up the sludge under conditions to form a hot gas mixture containing water and hydrocarbon oil vapors, cooling the mixture to form a condensate comprising water and oil, separating water and oil, distilling the oil and recovering as condensate a fraction boiling at temperature not less than about 340–350° F. and comprising water insoluble sulphur constituents, treating water insoluble constituents of such fraction with hexavalent chromium compound in the presence of sufficient sulphuric acid to keep chromium in solution to convert at least a portion of said sulphur constituents to water soluble form, and recovering water soluble sulphur bearing oil from the resulting reaction mass.

9. The method for making water soluble sulphur bearing oil comprising dissociating sludge material, resulting from sulphuric acid treatment of hydrocarbon oil distillate obtained from sulphur containing crudes, with aid of heat at temperature of not more than about 750° F. to break up the sludge under conditions to form a hot gas mixture containing water and hydrocarbon oil vapors, cooling the mixture to form a condensate containing water and oil comprising water insoluble sulphur constituents, treating water insoluble constituents of such condensate with an oxidizing agent, selected from the group consisting of alkali metal dichromate, alkali metal chromate and alkali metal permanganate, to convert at least a portion of said sulphur constituents to water soluble form, and recovering water soluble sulphur bearing oil from the resulting reaction mass.

10. The method for making water soluble sulphur bearing oil comprising dissociating sludge material, resulting from sulphuric acid treatment of hydrocarbon oil distillate obtained from sulphur containing crudes, with aid of heat at temperature of not more than about 750° F. to break up the sludge under conditions to form a hot gas mixture containing water and hydrocarbon oil vapors, cooling the mixture to form a condensate containing water and oil comprising water insoluble sulphur constituents, treating water insoluble constituents of such condensate with an oxidizing agent, selected from the group consisting of alkali metal dichromate, alkali metal chromate and alkali metal permanganate, to convert at least a portion of said sulphur constituents to water soluble form, the amount of the oxidizing agent used being not in excess of about 10% by weight of the reaction mass, and recovering water soluble sulphur bearing oil from the resulting reaction mass.

11. The method for making water soluble sulphur bearing oil comprising dissociating sludge material, resulting from sulphuric acid treatment of hydrocarbon oil distillate obtained from sulphur containing crudes, with aid of heat at temperature of not more than about 750° F. to break up the sludge under conditions to form a hot gas mixture containing water and hydrocarbon oil vapors, cooling the mixture to form a condensate containing water and oil comprising water insoluble sulphur constituents, treating water insoluble constituents of such condensate with hexavalent chromium compound to convert at least a portion of said sulphur constituents to water soluble form, and recovering water soluble sulphur bearing oil from the resulting reaction mass.

HENRY F. MERRIAM.
GEORGE W. CUPIT, Jr.